United States Patent
David et al.

(10) Patent No.: US 10,198,290 B2
(45) Date of Patent: Feb. 5, 2019

(54) METHOD FOR COMPOSING AND EXECUTING A REAL-TIME TASK SEQUENCE PLAN

(71) Applicant: KRONO-SAFE, Orsay (FR)

(72) Inventors: Vincent David, Marcoussis (FR); Adrien Barbot, Orsay (FR)

(73) Assignee: KRONO-SAFE, Orsay (FR)

( * ) Notice: Subject to any disclaimer, the term of this patent is extended or adjusted under 35 U.S.C. 154(b) by 60 days.

(21) Appl. No.: 15/105,219

(22) PCT Filed: Nov. 27, 2014

(86) PCT No.: PCT/FR2014/053055
§ 371 (c)(1),
(2) Date: Jun. 16, 2016

(87) PCT Pub. No.: WO2015/092188
PCT Pub. Date: Jun. 25, 2015

(65) Prior Publication Data
US 2017/0004011 A1    Jan. 5, 2017

(30) Foreign Application Priority Data
Dec. 18, 2013 (FR) .................................... 13 62893

(51) Int. Cl.
*G06F 9/46* (2006.01)
*G06F 9/48* (2006.01)

(52) U.S. Cl.
CPC ............ *G06F 9/4887* (2013.01); *G06F 9/485* (2013.01)

(58) Field of Classification Search
None
See application file for complete search history.

(56) References Cited

U.S. PATENT DOCUMENTS

| 2006/0218558 A1* | 9/2006 | Torii | G06F 9/4887 |
| | | | 718/107 |
| 2009/0119668 A1* | 5/2009 | Foley | G06F 8/75 |
| | | | 718/102 |

OTHER PUBLICATIONS

Feb. 18, 2015 International Search Report issued in International Patent Application No. PCT/FR2014/053055.

(Continued)

*Primary Examiner* — Tammy E Lee
(74) *Attorney, Agent, or Firm* — Oliff PLC (57) ABSTRACT

A method for executing two tasks in timesharing, includes: decomposing offline each task in a repetitive sequence of consecutive frames, and defining a start date and deadline by which an associated atomic operation must respectively start and end; verifying for each frame of a first of the repetitive sequences the corresponding operation can be performed between any two successive operations of a group of frames of the second repetitive sequence, overlapping the first repetitive sequence frame; and if the verification is satisfied, allowing the execution of the two tasks. Scheduling the operations of the two tasks, if two operations can start, executing the operation having the shorter deadline; and if a single operation can start, executing it if its execution need is less than the time remaining until the next frame start date of the other sequence, plus the time margin associated with the next frame of the other sequence.

11 Claims, 3 Drawing Sheets

(56) References Cited

OTHER PUBLICATIONS

Jia Xu et al. "Scheduling Processes With Release Times, Deadlines, Precedence, and Exclusion Relations". IEEE Transactions on Software Engineering, IEEE Service Center, Los Alamitos, CA, US, vol. 16, No. 3, Mar. 1990, pp. 360-369.

Baruah, Sanjoy. "The Limited-Preemption Uniprocessor Scheduling of Sporadic Task Systems". Real-Time Systems, 2005 (ECRTS 2005), Proceedings, 17th Euromicro Conference on Palma de Mallorca, Balearic Islands, Spain, Jul. 6-8, 2005, Piscataway, NJ, USA, IEEE, Jul. 6, 2005, pp. 137-144.

Christophe Aussaguès et al. "A Method and a Technique to Model and Ensure Timeliness in Safety Critical Real-Time Systems". Engineering of Complex Computer Systems, 1998, ICECCS '98, Proceedings, Fourth IEEE International Conference on Monterey, CA, USA, Aug. 10-14, 1998, Los Alamitos, CA, USA, IEEE Comput. Soc, US, Aug. 10, 1998, pp. 2-12.

Ara Khil et al. "Non-Preemptive Scheduling of Real-Time Periodic Tasks With Specified Release Times". IEICE Transactions on Information and Systems, Information & Sytems Society, Tokyo, JP, vol. E80-D, No. 5, May 1997, pp. 562-572.

F. Cottet et al. "Off-Line Temporal Analysis of Hard Real-Time Applications". Real-Time Applications, 1994, Proceedings of the IEEE Workshop on Washington, DC, USA, Jul. 21-22, 1994, Los Alamitos, CA, USA, IEEE Comput. Soc, Jul. 21, 1994, pp. 28-32.

Ben Kao et al. "Subtask Deadline Assignment for Complex Distributed Soft Real-Time Tasks". Proceedings of the International Conference on Distributed Computing Systems, Poznan, Poland, Jun. 21-24, 1994, [Proceedings of the International Conference on Distributed Computing Systems], Los Alamitos, IEEE Comp. Soc. Press, US, vol. CONF. 14, Jun. 21, 1994, pp. 172-181.

Xiaoping (George) Yuan et al. "A Decomposition Approach to Non-Preemptive Real-Time Scheduling". Real Time Systems, Kluwer Academic Publishers, Dordrecht, NL, vol. 6, No. 1, Jan. 1994, pp. 7-35.

Wei-Kuan Shih et al. "Scheduling Tasks With Ready Times and Deadlines to Minimize Average Error". Operating Systems Review, ACM, New York, NY, US, vol. 23, No. 3, Jul. 1989, pp. 14-28.

C.L. Liu et al. "Scheduling Algorithms for Multiprogramming in a Hard-Real-Time Environment". Journal of the Association for Computing Machinery, ACM, New York, NY, US, vol. 20, No. 1, Jan. 1973, pp. 46-61.

* cited by examiner

Fig 8 ate processing. This causes interference between
METHOD FOR COMPOSING AND EXECUTING A REAL-TIME TASK SEQUENCE PLAN

FIELD

The invention relates to multi-tasking real-time critical systems, such as control and monitoring systems used in the fields of transport (automotive, railway, naval, aerospace), industrial automation, energy, as well as other systems for which controlled allocation of resources is important, as in communications networks. The invention relates both to real-time systems for which a high level of implementation performance is required and to critical systems for which a high level of warranty is required as regards the use of hardware resources allocated to each task in the system.

BACKGROUND

In critical real-time systems, i.e. systems that do not tolerate any deadline violation through a belated execution of an operation, tasks are often executed through static scheduling methods. A static temporal allocation of the need for execution resources is then constructed offline, which demonstrates the temporal independence of tasks between them as regards the use of resources, and in particular the processor. This approach is described, for example, in the article ["A method and a technique to model and ensure timeliness in safety critical real-time systems", C. Aussaguès, V. David, Fourth IEEE International Conference on Engineering of Complex Computer Systems, 1998], and in patent applications WO2006-050967 and US2010-0199280.

However, this approach requires considering only a single sequencing plan for all activities, thus considering only a single time base for determining deadlines. This makes implementations without interference on a single processor difficult, for tasks with uncorrelated time bases, such as a task using a clock to determine its deadlines and a task using a position of a variable speed object to determine its deadlines. This would imply building two sequencing plans clocked by a common time base so that they can be composed in a single sequencing plan without interference between tasks. This is achievable in practice only where the resources are largely oversized to account for the worst-case scenario of each situation.

In some real-time systems having a high level of performance, that are not defined as "critical" because they can tolerate deadline violations within a certain margin, the composition of two sequencing plans clocked by different time bases is performed by dynamic scheduling algorithms. Such algorithms are described, for example, in ["Scheduling algorithms for multiprogramming in a hard real-time environment", C. Liu, J. Layland, Journal of the ACM, vol. 20, no. 1, pp. 46-61] and ["Foundations of Real-Time Computing: Scheduling and Resource Management", edited by André M. Van Tilborg, Gary M. Koob, 1991, Kluwer Academic Publishers] and also in ["A method and a technique to model and ensure timeliness in safety critical real-time systems", C. Aussaguès, V. David, Fourth IEEE International Conference on Engineering of Complex Computer Systems, 1998].

With these algorithms, preemptions are inevitable, i.e. the operating system can interrupt an ongoing operation to execute a more urgent operation. Scheduling being dynamic, the number and duration of the preemptions is not determinable, and each preemption introduces an overhead to perform context switching. This causes interference between tasks, so that the systems are more difficult to size, less predictable and not reproducible on complex processor architectures. Designers of such systems also encounter difficulties to properly set task priorities or deadlines in a system with two different time bases. The chosen options, such as the variation in execution needs depending on the values of application parameters, make systems constructed in this way very complex and uncontrollable.

SUMMARY

There is thus a need for a technique capable of executing in time sharing two sequencing plans without interference, even if the time bases of the two plans are different.

This need is addressed by providing a method for executing two tasks in timesharing, comprising the steps of decomposing offline each task in a repetitive sequence of consecutive frames in a time base associated with the task, wherein each frame is associated with an atomic operation having an execution need, and defines a start date from which the operation may start and a deadline by which the operation must end, whereby each frame defines a time margin in which the operation may start; verifying for each frame of a first of the repetitive sequences that the corresponding operation can be performed between any two successive operations of a group of frames of the second repetitive sequence, overlapping the frame of the first repetitive sequence, while respecting the start dates and deadlines of the operations; and if the verification is satisfied, allowing the execution of the two tasks.

The operations of the two tasks are then scheduled according to the following cases, evaluated at each key date, wherein a key date occurs at each deadline, each start date, and each end of operation: if two operations can start, executing the operation having the shorter deadline; and if a single operation can start, executing it only if its execution need is less than the time remaining until the start date of the next frame of the other sequence, plus the margin of time associated with said next frame of the other sequence.

Each frame may further comprise a reserve time interval that may be zero, located after the deadline of the frame or before the start date of the frame, wherein the reserve time intervals of any one of the repetitive sequences may be used to execute an operation of the other repetitive sequence.

The verification step may comprise the following steps:
for each frame $Fa_i$ of the first repetitive sequence, evaluating the following conditions for each frame $Fb_j$ of the second repetitive sequence:

$$Da_i \leq Tb_{j+1} \qquad [A.1]$$

$$Da_i \leq Rb_j + Tb_{j+1}$$

and $$Db_j \leq Ta_i, \qquad [B.1]$$

and $$Db_j \leq Ta_i, \qquad [C.1]$$

where D, T and R are the execution need, the time margin, and reserve time, indexed by a repetitive sequence identifier and the frame number in the sequence;
repeating the condition evaluations with the frames $Fa_i$ and $Fb_j$ exchanged;
authorizing execution of the tasks if the three conditions [A.1], [B.1] and [C.1] are satisfied for any pair (i, j).

The verification step may comprise the following additional steps:
if the condition [A.1] is false, evaluating the following condition:

$$Da_i \leq Tb_{j+1}+Rb_{j+1}+Tb_{j-2}$$

and $$Da_i+Db_{j+1} \leq Ta_i+Tb_{j+1} \quad [A.2]$$

if the condition [B.1] is false, evaluating the following condition:

$$Da_i \leq Tb_{j+1}+Rb_{j+1}+Tb_{j+2}$$

and $$Db_j+Da_i+Db_{j+1} \leq Ta_i+Tb_{j+1} \quad [B.2]$$

if the condition [C.1] is false, evaluating the following condition:

$$Db_j \leq Ta_i + \min[Tb_j - Da_i, Ra_i, Ra_{i-1}] \quad [C.2]$$

authorizing execution of the tasks if the conditions [A.1] or [A.2] and [B.1] or [B.2] and [C.1] or [C.2] are met for each pair (i, j).

The time bases determining the durations of the frames may be variable so that the time margins T and the reserve times R vary by a factor 1 to za for the frames Fa and a factor 1 to zb for the frames Fb. The verification step may then further comprise the steps of:
if the condition [A.1] is false, evaluating the following condition:

$$Da_i \leq Tb_{j+1}+Rb_{j+1}+Tb_{j+2}$$

and $$\min[ql(zb \cdot (Tb_j+Rb_j)+(zb-1)Db_j), Da_i]+Db_{j+1} \leq Ta_i \quad [A.2]$$

where $ql=(Da_i-Tb_{j+i})/(Tb_j+Rb_j)$;
if the condition [B.1] is false, evaluating the following condition:

$$Da_i \leq Tb_{j+1}+Rb_{j+1}+Tb_{j+2}$$

and $$Db_j+\min[ql(zb \cdot Tb_j+(zb-1)Db_j)+zb \cdot Rb_j, Da_i]+Db_{j+1} \leq Ta_i \quad [B.2]$$

where $ql=(Da_i-Rb_j-Tb_{j+1})/Tb_j$;
if the condition [C.1] is false, evaluating the following condition:

$$Db_j \leq Ta_i+\min[Tb_j-Da_i, Ra_i, Ra_{i-1}] \quad [C.2]$$

authorizing execution of the tasks if the conditions [A.1] or [A.2] and [B.1] or [B.2] and [C.1] or [C.2] are met for each pair (i, j).

The verification step may comprise the following steps:
if the condition [B.1] is false, evaluating the following condition before the condition [B.2]:

$$Da_i \leq Tb_j+Rb_j+Tb_{j+1}$$

and $$Db_{j-1} \leq Tl+\min[Tb_{j-1}+Db_{j-1}+Rb_{j-1}-Tl-Da_{i-1}, Ra_{i-2}] \quad [B.1.1]$$

where $ql=(Da_i-Rb_j-Tb_{j+1})/Tb_j$ and $Tl=Ta_{i-1}-(1-ql)Tb_j+Ra_{i-1}$ authorizing execution of the tasks if the conditions [A.1] or [A.2] and [B.1] or [B.1.1] and [C.1] or [C.2] are met for each pair (i, j).

BRIEF DESCRIPTION OF DRAWINGS

Other advantages and features will become more clearly apparent from the following description of particular embodiments of the invention provided for exemplary purposes only and represented in the appended drawings, in which:

FIGS. 3A to 3C illustrate different possibilities of time-sharing two repetitive sequences of frames, where FIG. 3C illustrates an error condition;

DESCRIPTION OF EMBODIMENTS

A real-time task may be considered as a sequence of basic processes or operations to be performed one after the other, where each operation has a deadline in a time base associated with the task. In a critical real-time system, deadlines are mandatory, i.e. an operation that exceeds its deadline would cause an error condition and a system shut-down, for example. The techniques described below are applicable to such a system to improve the level of performance in that multiple tasks, even with uncorrelated time bases, may be executed in time-sharing on the system.

Figure 1:
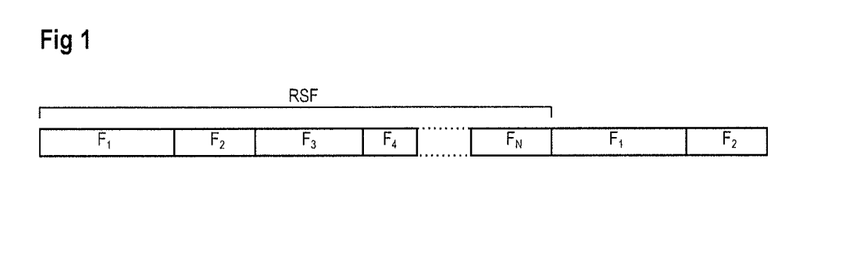
FIG. 1 shows an example of a repetitive sequence of frames used for composing a sequencing plan for a task.

FIG. 1 illustrates a decomposition of a task into a repetitive sequence of frames RSF, where each frame F is assigned to a sequential operation of the task. The task is implemented by executing the repetitive sequence RSF in a loop.

Figure 2:
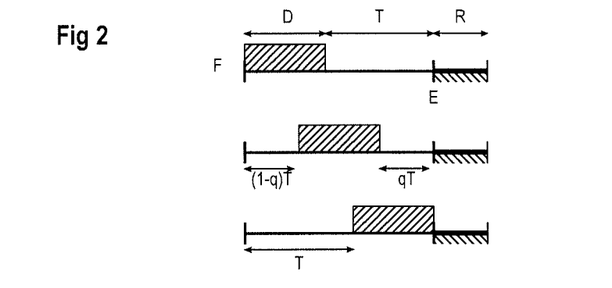
FIG. 2 shows the structure of a frame of a repetitive sequence and different possibilities of starting an operation in the frame.

FIG. 2 shows a temporal structure of a frame F. The start of the frame is the date from which the operation may begin. The frame defines a deadline E at which the operation should be completed. The operation is assumed to be atomic, i.e. the operation cannot be suspended to perform another operation. The deadline E may precede the end of the frame by an optional reserve time slot R that may be zero. A time interval D is an execution need of the operation associated with the frame. The execution need D corresponds, for example, to the number of processor clock cycles required to execute the operation—it may thus be expressed as a fixed time depending on the characteristics of the processor of the target system. An interval T corresponds to a time margin between the start of the frame and the deadline E to execute the operation.

Thus, as shown in FIG. 2, the operation may begin anywhere between the start of the frame, where the interval T lies between the end of the operation and the deadline, and a time T after the start of the frame, where the operation ends just at the deadline E. For intermediate situations, qT denotes the interval between the end of the operation and the deadline, with $0 \leq q \leq 1$, and $(1-q)T$ denotes the complementary interval between the beginning of the frame and the beginning of the operation.

The sum of the reserve intervals R is, for example, a time that the programmer allocates the system to conduct non real-time operations, such as input/output.

Two tasks that should be performed in time-sharing on critical real-time system are thus broken down into repetitive sequences of frames. For the tasks to be executable without interference, i.e. respecting the atomicity of operations, it is sought to compose the sequences so that each operation of one sequence can be executed at any time between two successive operations of the other sequence, while respecting the constraints of the frames of the two sequences, namely the deadlines and frame starts.

Figure 3A:
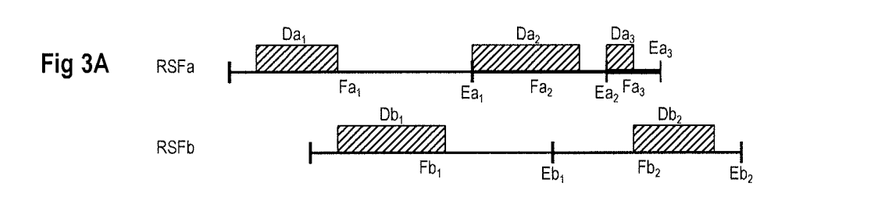
Figure 3B:
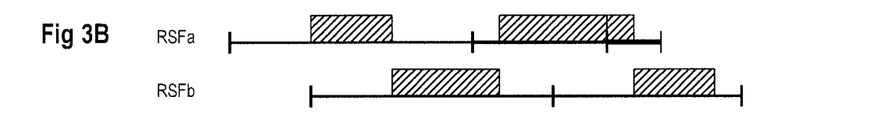
Figure 3C:
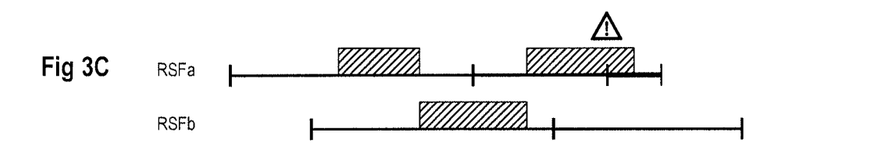

FIGS. 3A-3C show various situations that may be encountered while unfolding two sequences RSFa and RSFb. It is assumed, for sake of simplicity, that the reserve intervals R are zero.

In FIG. 3A, as an example, the sequence RSFa includes three frames $Fa_1$ to $Fa_3$ of respective parameters ($Da_1=3$, $Ta_1=6$), ($Da_2=4$, $Ta_2=1$), and ($Da_3=1$, $Ta_3=1$), where time values are expressed in normalized units. The sequence RSFb begins 3 units after the start of frame $Fa_1$ and it comprises two frames $Fb_1$ and $Fb_2$ of respective parameters ($Db_1=4$, $Tb_1=5$) and ($Db_2=3$, $Tb_2=4$).

The operation $Da_1$ begins one unit after the start of the corresponding frame. At the end of operation $Da_1$, the operation $Da_2$ cannot be started yet, but operation $Db_1$ may be started. At the end of operation $Db_1$, no operation is ready for execution. The start of frame $Fa_2$, here deadline $Ea_1$, is awaited for starting the operation $Da_2$. At the end of the operation $Da_2$, the operation $Db_2$ is executable, but it should not be started. Indeed, if operation $Db_2$ were launched immediately, it would end just at the deadline $Ea_3$, whereby the operation $Da_3$ could not run before that deadline. In this situation, the beginning of the frame $Fa_3$ is awaited to launch the operation $Da_3$. Finally, the operation $Db_2$ can start at the end of operation $Da_3$.

In FIG. 3B, the same parameters are preserved, except that the operation $Da_1$ starts three units after the beginning of the frame. The operations $Db_1$ and $Da_2$ are delayed by two units with respect to FIG. 3A, while respecting the constraints of the corresponding frames. The operation $Da_2$ ends just at its deadline $Ea_2$.

In FIG. 3C, the same parameters are preserved, except that the operation $Da_1$ now starts four units after the beginning of the frame. The operations $Db_1$ and $Da_2$ are delayed by three units with respect to FIG. 3A. The operation $Db_1$ can still be executed while respecting its deadline $Eb_1$, but the operation $Da_2$ violates its deadline $Ea_2$.

A first step common to the techniques referred to herein includes the composition, for two tasks to execute in time-sharing, of two repetitive sequences RSFa and RSFb that can be unwound in the conditions of FIG. 3A or 3B, regardless of the delay between the beginnings of the sequences. This composition is static, that is to say achieved offline by the programmer.

A second step includes verifying that any two sequences are compatible, i.e. that they can be unwound so that each operation can be executed within its constraints, such as in FIGS. 3A and 3B.

This compatibility verification may be implemented in a development tool designed for the programmer to compose sequences by trial and error. It is preferably also carried out in the real-time system itself, upon loading for execution sequencing plans defined by the two repetitive sequences. The system may then be configured to refuse operation if the sequences are detected as incompatible.

A third step includes scheduling the operations of the two sequences in the real-time system. As the figures show, it is not sufficient for achieving correct operation to alternate the operations of the first sequence with the operations of the second sequence or to start an operation when it is ready for execution. Scheduling may be achieved according to the following cases, assessed at each key date. Key dates may be defined as the beginnings of the frames in the two sequences, the deadlines, and the operation ends. When the reserve time slots R (FIG. 2) are zero, like in the presented examples, deadlines coincide with frame starts. For a given key date associated with a first of the sequences, the term "concurrent frame" denotes the current frame of the second sequence.

1) No operation can start. This occurs when an operation is already in progress (as at deadline $Eb_1$ of FIG. 3A), or at the end of an operation that runs between the operation of the concurrent frame and its deadline, as for operation $Db_1$ of FIG. 3A. In this case, the next key date is awaited.

2) Two operations can start. This usually happens when starting a frame while an operation is waiting in the concurrent frame, as is the case at deadline $Ea_2$ of FIGS. 3A and 3B. The operation having the shortest deadline is then executed ($Da_3$ in FIGS. 3A and 3B). The case also occurs when two concurrent frames start at the same time.

3) A single operation can start. This usually happens at the end of an operation ($Da_1$), or at the beginning of a frame when the operation of the concurrent frame has ended ($Ea_1$, FIG. 3A). The operation is executed only if its execution need is less than, or equal to the time remaining until the start of the next concurrent frame, plus the time margin associated with this concurrent frame. For example, in FIG. 3A, the operation $Da_2$ is ready to start at deadline $Ea_1$, there are 3 units left until the beginning of frame $Fb_2$ and $Tb_2=4$. The operation $Da_2$ is started because $Da_2=4<3+4$.

Otherwise, the next key date is awaited to reassess the situation. For example, in FIG. 3A, the operation $Db_2$ is ready for execution at the end of the operation $Da_2$. However, there is one unit left until the beginning of the frame $Fa_3$ and $Ta_3=1$, hence $Db_2=3>1+1$.

Compatibility criteria will now be defined between any two repetitive sequences RSFa and RSFb used in sequencing plans for a real-time system.

An exhaustive compatibility check would involve examining all possible combinations of positions of the operations in their frames and all possible positions of the sequences relative to each other, with a granularity of one clock cycle, to assess whether concurrent operations can be executed according to the imposed constraints.

Such an exhaustive verification would be difficult to achieve in a reasonable time. Simplified criteria are sought that can be evaluated online on the real-time system upon loading sequencing plans accompanying executable code for the tasks. For this purpose, three general assumptions are considered regarding the positioning of each frame of one of the sequences with respect to each frame of the other sequence. For each assumption, it is verified that the operation of a given frame $Fa_i$ can be executed within an available slot left by the concurrent frames $Fb_j$, $Fb_{j+1}$, ... overlapping the frame $Fa_i$. Two frames $Fa_i$ and $Fb_j$ are considered compatible when the verification is satisfied for each of the three assumptions.

Assumption (A): the given frame $Fa_i$ starts when the operation $Db_j$ of the first concurrent frame $Fb_j$ has completed execution.

Assumption (B): the operation of the first concurrent frame is running.

Assumption (C): the operation of the concurrent frame has not started.

For each assumption, criteria are sought that are independent of the relative positions of the frames. For this purpose, in general, unknown time intervals used to find slots to perform operations are underestimated, and unknown time intervals used to check compliance with deadlines are overestimated.

Figure 4A:
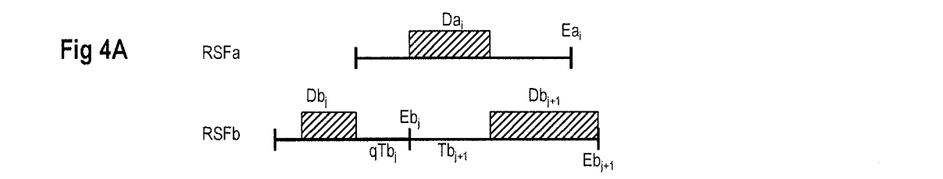
FIGS. 4A to 4C illustrate time-sharing situations of two sequences according to a first assumption for establishing validation criteria of a composition of two sequences.
Figure 4B:
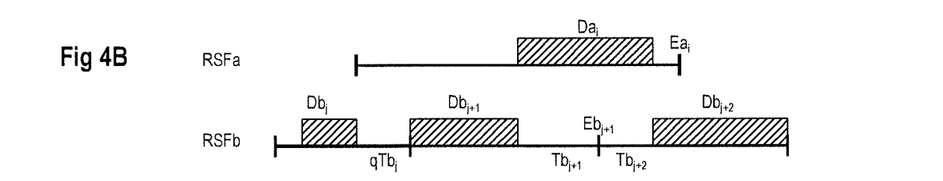
Figure 4C:
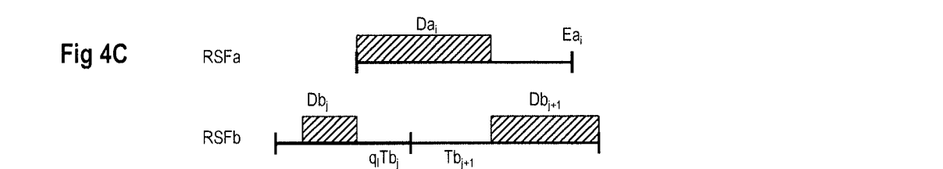

FIGS. 4A to 4C illustrate exemplary frames that may be used to develop compatibility criteria based on assumption (A). The given frame $Fa_i$ starts during the concurrent frame $Fb_j$, when the operation $Db_j$ of this concurrent frame has completed. The frame $Fa_i$ overlaps the next concurrent frame $Fb_{j+1}$. All that is known about the beginning of the frame $Fa_i$ is that it is located in an interval $qTb_j$ following the end of the operation $Db_j$, where $0 \leq q \leq 1$.

In FIG. 4A, the frame $Fa_i$ ends before the frame $Fb_{j+1}$. The operation $Da_i$ could be launched from the end of the operation $Db_j$, in an interval $qTb_j + Tb_{j+1}$. But q being unknown and arbitrary, the worst-case scenario is considered with q=0, whereby the operation $Da_i$ starts at the beginning of the frame $Fb_{j+1}$. Thus, the operation $Da_i$ can be executed if:

$$Da_i \leq Tb_{j+1}. \quad [A.1]$$

In FIG. 4B, the operation $Da_i$ does not meet the requirement A.1. It is then tried to execute the operation $Da_i$ astraddle the frames $Fb_{j+1}$ and $Fb_{j+2}$, meaning that the frame $Fa_i$ overlaps the three frames $Fb_j$ to $Fb_{j+2}$. This implies satisfying both a condition to ensure that the sum of intervals $Tb_{j+1}$ and $Tb_{j+2}$ is sufficient, and a condition to ensure that the deadline Eai will be met:

$$Da_i \leq Tb_{j+1} + Tb_{j+2}$$

AND $$qTb_j + Db_{j+1} + Da_i \leq Da_i + Ta_i, \text{ hence } qTb_j + Db_{j+1} \leq Ta_i$$

The worst case for respecting the deadline is q=1, increasing the left member of the inequality. Therefore the deadline Eai is met in all cases if:

$$Tb_j + Db_{j+1} \leq Ta_i$$

However, it is not realistic to consider in a same context worst-case situations using the two extremes of a same variable. In fact, a certain range of values for the variable q can be excluded when considering the behavior of the real system in the situation of FIG. 4A.

FIG. 4C shows the behavior of the real system in the situation of FIG. 4A. Once the operation $Db_j$ ends, the system, having on-line knowledge of the frame parameters, launches operation $Da_i$ at the beginning of the frame $Fa_i$, as long as:

$$Da_i \leq qTb_j + Tb_{j+1}$$

that is to say, if conditions 3) of the scheduling method are met.

Let ql be the limit value of q to achieve equality in the above inequality:

$$Da_i = qlTb_j + Tb_{j+1}, \text{ hence } ql = (Da_i - Tb_{j+1})/Tb_j$$

If $q \geq ql$, it is certain that the execution of the real system occurs according to FIG. 4C and that the situation of FIG. 4B is to be excluded. The worst case for FIG. 4B is then q=ql, whereby:

$$qlTb_j + Db_{j+1} \leq Ta_i, \text{ hence, by replacing } ql \text{ by its value,}$$

$$Da_i - Tb_{j+1} + Db_{j+1} \leq Ta_i, \text{ or } Da_i + Db_{j+1} \leq Ta_i + Tb_{j+1}$$

The expression used to calculate the value ql is not limited to 1. If ql exceeds 1, it does not make practical sense. The value ql is thus capped at 1.

The conditions resulting from the situation of FIG. 4B are thus:

$$Da_i \leq Tb_{j+1} + Tb_{j+2}$$

AND $$qlTb_j + Db_{j+1} \leq Ta_i \quad [A.2]$$

The condition A.1 is verifiable in a situation where the frame $Fa_i$ overlaps at least two consecutive frames Fb. The condition A.2 is verifiable in a situation where the frame $Fa_i$ overlaps at least three consecutive frames Fb. In a similar manner, conditions A.3 and following may be found that are verifiable in situations where the frame $Fa_i$ overlaps at least four or more consecutive frames Fb, but the likelihood of satisfying such conditions decreases rapidly. The conditions A.1 and A.2 (and, if applicable, A.3 and following) are alternative, that is to say, it is sufficient that any one of these conditions is satisfied for jumping to the validation of the other assumptions.

Figure 5A:
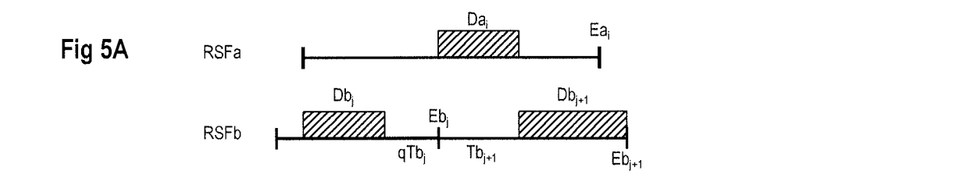
FIGS. 5A and 5B illustrate time-sharing situations of two sequences according to a second assumption for establishing validation criteria of a composition of two sequences.
Figure 5B:
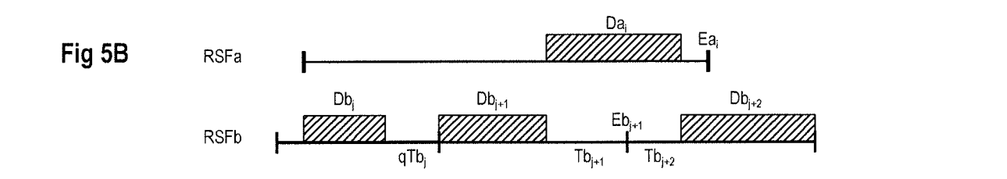

FIGS. 5A and 5B illustrate examples of frames that may be used to develop compatibility criteria based on the assumption (B). The frame $Fa_i$ starts during a concurrent frame $Fb_j$, while the concurrent operation $Db_j$ of this frame is ongoing. In the worst case, as shown, the operation $Db_j$ just starts. The situations are similar to those of FIGS. 4A and 4B, except that the duration $Db_j$ is accounted for to verify compliance with the deadline Eai.

According to FIG. 5A:

$$Da_i \leq Tb_{j+1}, \text{ and, to respect deadline } Eai, Db_j + Da_i \leq Da_i + Ta_i, \text{ hence } Db_j \leq Ta_i$$

The conditions resulting from the situation of FIG. 4B are thus:

$$Da_i \leq Tb_{j+1}$$

AND $$Db_j \leq Ta_i \quad [B.1]$$

From FIG. 5B, following the same reasoning as in FIG. 4B:

$$Da_i \leq Tb_{j+1} + Tb_{j+2}$$

AND $$Db_j + qlTb_j + Db_{j+1} \leq Ta_i \quad [B.2]$$

As for condition A.1, the condition B.1 is verifiable in a situation where the frame $Fa_i$ overlaps at least two consecutive frames Fb. The condition B.2 is verifiable in a situation where the frame $Fa_i$ overlaps at least three consecutive frames Fb. In a similar manner, conditions B.3 and following may be found that are verifiable in situations where the frame $Fa_i$ overlaps at least four or more consecutive frames Fb, but the likelihood of satisfying such conditions decreases rapidly. The conditions B.1 and B.2 (and, if applicable, A.3 and following) are alternative, that is to say, it is sufficient that any one of these conditions is satisfied for jumping to the validation of the other assumptions.

Figure 6:
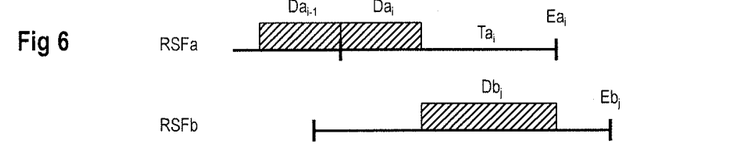
FIG. 6 illustrates a time-sharing situation of two sequences according to a third assumption for establishing validation criteria of a composition of two sequences.

FIG. 6 illustrates exemplary frames that can be used in the development of compatibility criteria based on the assumption (C). In the context of assumption (C) it is assumed that operation $Db_j$ has not been executed yet. If the deadline of the frame $Fa_i$ arrives after the deadline of the frame $Fb_j$, the same situations as those of FIGS. 5A and 5B are encountered, where the operation $Db_j$ just starts. Thus, under the assumption (C), only the case where the deadline of the frame $Fa_i$ occurs before the deadline of frame $Fb_j$ is analyzed.

Both operations $Da_i$ and $Db_j$ are ready for execution at the beginning of the frame $Fa_i$. It may be assumed that the operation $Db_j$ was not started at the beginning of its frame, because the scheduling conditions 3) have not been met, for example, as shown, when the operation $Da_{i-1}$ ends at its deadline at the beginning of frame $Fa_i$. The deadline Eai being the shortest, the operation $Da_i$ is launched first. The operation $Db_j$ is launched at the end of the operation $Da_i$. In the worst-case within the limits of assumption (C), the deadlines of frames $Fa_i$ and $Fb_j$ coincide, which implies:

$$Db_j \leq Ta_i \quad [C.1]$$

This same inequality is obtained assuming operation $Db_j$ starts at the beginning of the frame $Fa_i$, although the provided scheduling process would not proceed this way. For the operation $Da_i$ to end before its deadline, the inequality $Db_j + Da_i \leq Da_i + Ta_i$ is verified, i.e. the same inequality as above.

Each frame $Fa_i$ is thus compared to each frame $Fb_j$, ensuring that the deadlines of frames $Fa_i$ are met, without however verifying that the deadlines of the frames $Fb_j$ are met. This forms a first verification pass. A second pass to complete the verification is then to repeat the above operations by comparing each frame $Fb_j$ to each frame $Fa_i$, thereby ensuring that the deadlines of frames $Fb_j$ are met.

The verification of the compatibility of two repetitive sequences RSFa and RSFb having Na and Nb frames respectively, may be summarized by the following pseudo code. In this pseudo-code, alternative conditions are condensed in expressions min(x, y) at the left side of inequalities, and max(x, y) at the right side of inequalities and necessary conditions are condensed in expressions min(x, y) on the right side of inequalities, and max(x, y) on the left side of inequalities. Conditions A.3 and B.3 have been provided, as mentioned above, to reflect the event that frame $Fa_i$ overlaps four frames $Fb_j$ to $Fb_{j+3}$. Operations on the indices i and j are performed modulo the maximum value of the index (Na for i, and Nb for j), since the frame sequences are repeatable indefinitely.

```
For each i between 0 and Na−1 do:
    For each j between 0 and Nb−1 do:
        [A.1]
        if Da_i ≤ Tb_{j+1} then continue at [B.1]
        [A.2]
        ql := (Da_i − Tb_{j+1})/Tb_j
        if ql > 1 or Tb_j = 0 then ql := 1
        if Da_i ≤ Tb_{j+1} + Tb_{j+2}
        and qlTb_j + Db_{j+1} ≤ Ta_i
            then continue at [B.1]
        [A.3]
        if Da_i ≤ Tb_{j+2} + Tb_{j+3}
        and qlTb_j + Db_{j+1} + Db_{j+2} + min[ Tb_{j+1}, Da_i ] ≤ Ta_i
            then continue at [B.1]
        exit the loop with failure code
        [B.1]
        if Da_i ≤ Tb_{j+1}
        and Db_j ≤ Ta_i
            then continue at [D]
        [B.1.1]
        ql := (Da_i − Tb_{j+1})/Tb_j
        if ql > 1 or Tb_j = 0 then ql := 1 and continue at [B.2]
        Tl := Ta_{i−1} − (1−ql)Tb_j
        if Db_{j−1} ≤ Tl
            then continue at [C.1]
        [B.2]
        if Da_i ≤ Tb_{j+1} + Tb_{j+2}
        and Db_j + qlTb_j + Db_{j+1} ≤ Ta_i
            then continue at [C.1]
        [B.3]
        if Da_i ≤ Tb_{j+2} + Tb_{j+3}
        and Db_j + qlTb_j + Db_{j+1} + min[ Tb_{j+1}, Da_i ] + Db_{j+2} ≤ Ta_i
            then continue at [C.1]
        exit the loop with failure code
        [C.1]
        if Db_j ≤ Ta_i
            then continue at [D]
        exit the loop with failure code
    [D] next j
next i
```

To complete the verification, as previously indicated, this loop may be repeated switching the frames Fa and Fb.

In this loop, according to an alternative with respect to what has been described above, before proceeding with the evaluation of the condition B.2, a condition B.1.1 is evaluated.

Figure 7:
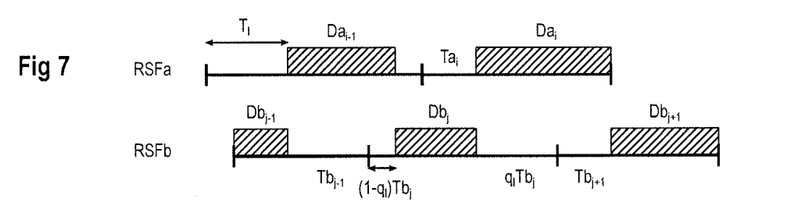
FIG. 7 illustrates an example of a succession of frames for establishing another validity condition in the situation of FIG. 5A.

FIG. 7 shows an exemplary succession of frames illustrating the establishment of the condition B.1.1. The frames $Fa_i$ and $Fb_j$ are in the same conditions as in FIG. 4A, but instead of starting the operation $Da_i$ at the beginning of the frame $Fb_{j+1}$, it is assumed that it may start immediately after operation $Db_j$, and the general conditions that allow this with q=ql are sought in the previous frames $Fa_{i-1}$ and $Fb_{j-1}$. Condition B.1.1, as condition B.1 is based on the assumption that the frame $Fa_i$ overlaps two frames ($Fb_j$ and $Fb_{j+1}$), corresponding to a situation more likely to occur than one where the frame $Fa_i$ overlaps three frames or more.

As previously indicated, the frames may include a reserve time R which may be taken by the system to perform non-real-time tasks. Such a reserve time may be used to perform real-time operations. It adds to the time margins T of one sequence to promote the execution of operations D of the other sequence, but it may harden the conditions for meeting deadlines.

Non-zero reserve times R may in particular relax the condition C.1.

Figure 8:
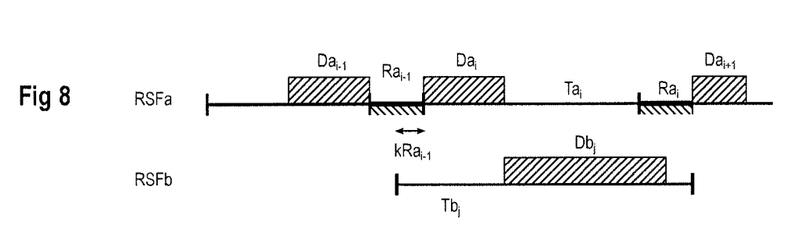
FIG. 8 shows an additional execution situation of two sequences according to the third assumption, allowing to establish alternative validity conditions.

FIG. 8 shows an exemplary succession of frames for establishing a relaxed constraint when the condition C.1 is not satisfied, that is to say if $Db_j > Ta_i$. Under the assumption C it is assumed that the operation $Db_j$ has not yet started at the beginning of the frame $Fa_i$. The operation $Da_i$, having the shortest deadline, is started right at the beginning of the frame $Fa_i$. The frame $Fb_j$ starts before the frame $Fa_i$, it is assumed during the interval $Ra_{i-1}$ of frame $Fa_{i-1}$. The interval between the beginning of the frame $Fb_j$ and the beginning of the frame $Fa_i$ is denoted $kRa_{i-1}$, with $0 \leq k \leq 1$.

If the operation $Db_j$ was not scheduled at the beginning of its frame $Fb_j$, it means that:

$$Db_j > kRa_{i-1} + Ta_i.$$

The limit value of k is denoted kl, such that $Db_j = klRa_{i-1} + Ta_i$, hence $kl = (Db_j - Ta_i)/Ra_{i-1}$. If k>kl, it is certain that the operation $Db_j$ can be scheduled before the beginning of the frame $Fa_i$—this case should not be considered because it does not fit the assumption C. Only the values of k between 0 and kl are considered.

For operation $Da_i$ to be executable, it should meet the condition $Da_i \leq Tb_j - kRa_{i-1}$. The worst case is k=kl, whereby:

$Da_i \leq Tb_j - klRa_{i-1}$, i.e., substituting kl by its value:

$Da_i \leq Tb_j - (Db_j - Ta_i)$, or $Db_j \leq Ta_i + Tb_j - Da_i$

The coefficient kl is at most equal to 1, which is expressed by:

$Db_j - Ta_i \leq Ra_{i-1}$, or $Db_j \leq Ta_i + Ra_{i-1}$

Finally, to not constrain the execution of the operation $Da_i+1$, the operation $Db_j$ should not overlap the frame $Fa_{i+1}$. This is satisfied if:

$Db_j \leq Ta_i + Ra_i$.

This leads to the following condition, an alternative to condition C.1:

$Db_j \leq Ta_i + Tb_j - Da_i$

AND $Db_j \leq Ta_i + Ra_{i-1}$

AND $Db_j \leq Ta_i + Ra_i$    [C.2]

The following pseudo-code takes into account the reserve times R.

```
For each i between 0 and Na-1 do:
    For each j between 0 and Nb-1 do:
        [A.1]
        if Da_i ≤ Tb_{j+1} then continue [B.1]
        [A.2]
        ql := (Da_i - Tb_{j+1})/(Tb_j + Rb_j)
        if ql > 1 ou Tb_j + Rb_j = 0 alors ql := 1
        if Da_i ≤ Tb_{j+1} + Rb_{j+1} + Tb_{j+2}
        and ql(Tb_j + Rb_j) + Db_{j+1} ≤ Ta_i
            then continue at [B.1]
        [A.3]
        if Da_i ≤ Tb_{j+2} + Rb_{j+2} + Tb_{j+3}
        and Db_{j+1} + ql(Tb_j + Rb_j)
        + Db_{j+2} + min[ Tb_{j+1} + Rb_{j+1}, Da_i ] ≤ Ta_i
            then continue at [B.1]
        exit the loop with failure code
        [B.1]
        if Da_i ≤ Rb_j + Tb_{j+1}
        and Db_j ≤ Ta_i
            then continue at [C.2]
        ql := (Da_i - Rb_j - Tb_{j+1})/Tb_j
        if ql > 1 ou Tb_j = 0 then ql := 1 and continue at [B.2]
        [B.1.1]
        Tl := Ta_{i-1} - (1-ql)Tb_j + Ra_{i-1}
        if Db_{j-1} ≤ Tl + min[ Tb_{j-1} + Db_{j-1} + Rb_{j-1} - Tl - Da_{i-1}, Ra_{i-2} ]
            then continue at [C.1]
        [B.1.2]
        if Db_{j-1} + Rb_{j-1} ≤ Tl
        and Da_{i-1} ≤ Tb_{j-2} + Rb_{j-2} + Tb_{j-1}
        and Tb_{j-2} + Db_{j-2} + Rb_{j-2} + Tb_{j-1} + Db_{j-1} + Rb_{j-1} ≤
        Ra_{i-2} + Tl + Da_{i-1}
            then continue at [C.1]
        [B.2]
        if Da_i ≤ Tb_{j+1} + Rb_{j+1} + Tb_{j+2}
        and Db_j + qlTb_j + Rb_j + Db_{j+1} ≤ Ta_i
            then continue at [C.1]
        [B.3]
        if Da_i ≤ Tb_{j+2} + Rb_{j+2} + Tb_{j+3}
        and Db_j + qlTb_j + Rb_j
        + Db_{j+1} + min[ Tb_{j+1} + Rb_{j+1}, Da_i ]
        + Db_{j+2} ≤ Ta_i
            then continue at [C.1]
        exit the loop with failure code
        [C.1]
        if Db_j ≤ Ta_i
            then continue at [D]
        [C.2]
        if Db_j ≤ Ta_i + min[ Tb_j - Da_i, Ra_i, Ra_{i-1} ]
            then continue at [D]
        exit the loop with failure code
    [D] next j
next i
```

The condition B.1.2 that appears in this pseudo-code is determined using the same approach as for the condition B.1.1, extending searches to frames $Fa_{i-2}$ and $Fb_{j-2}$.

Until now, it was assumed that the time bases for clocking the two tasks were isochronous, that is to say that the durations of the intervals of one of the sequences were not variable relative to those of the other sequence. In practice, it may be necessary to compose two tasks using uncorrelated time bases, like tasks indexed to the positions of elements that move at variable speeds.

To handle this case, a variability coefficient $z \geq 1$ is introduced for each repetitive sequence, za and zb respectively for the sequences RSFa and RSFb. The coefficients za and zb are fixed and represent the maximum slowdown of the intervals T and R in the two sequences. Assuming that the notations used in the previous relationships represent the minimum values of the intervals, each of the values T and R may thus assume two values, T or zT and R or zR. The execution needs D remain constant because they only depend on the system clock.

In the previous relationships, where an interval is used to find a slot to execute an operation, its underestimated value T or R is maintained. When the interval is used to check compliance with a deadline, its overestimated value zT or zR is used. The following pseudo code is then obtained.

```
For each i between 0 and Na-1 do:
    For each j between 0 and Nb-1 do:
        [A.1]
        if Da_i ≤ Tb_{j+1} then continue at [B.1]
        [A.2]
        ql := (Da_i - Tb_{j+1})/(Tb_j + Rb_j)
        if ql > 1 or Tb_j + Rb_j = 0 then ql := 1
        if Da_i ≤ Tb_{j+1} + Rb_{j+1} + Tb_{j+2}
        and min[ ql(zb·(Tb_j + Rb_j) + (zb-1)Db_j), Da_i ] + Db_{j+1} ≤ Ta_i
            then continue at [B.1]
        [A.3]
        if Da_i ≤ Tb_{j+2} + Rb_{j+2} + Tb_{j+3}
        and Db_{j+1} + min[ ql(zb·(Tb_j + Rb_j) + (zb-1)Db_j), Da_i ]
        + Db_{j+2} + min[ zb·(Tb_{j+1} + Rb_{j+1}) + (zb-1)Db_{j+1}, Da_i ] ≤ Ta_i
            then continue at [B.1]
        exit the loop with failure code
        [B.1]
        if Da_i ≤ Rb_j + Tb_{j+1}
        and Db_j ≤ Ta_i
            then continue at [C.2]
        [B.1.1]
        ql := (Da_i - Rb_j - Tb_{j+1})/Tb_j
        if ql > 1 or Tb_j = 0 then ql := 1 and continue at [B.2]
        Tl := Ta_{i-1} - (1-ql)Tb_j + Ra_{i-1}
        if Db_{j-1} ≤ Tl + min[ Tb_{j-1} + Db_{j-1} + Rb_{j-1} - Tl - Da_{i-1}, Ra_{i-2} ]
            then continue at [C.1]
```

```
    [B.1.2]
    if Db_{j-1} + zb·Rb_{j-1} ≤ Tl
    and Da_{i-1} ≤ Tb_{j-2} + Rb_{j-2} + Tb_{j-1}
    and zb·(Tb_{j-2} + Db_{j-2} + Rb_{j-2} + Tb_{j-1} + Db_{j-1} + Rb_{j-1}) ≤
    Ra_{i-2} + Tl +Da_{i-1}
        then continue at [C.1]
    [B.2]
    if Da_i ≤ Tb_{j+1} + Rb_{j+1} + Tb_{j+2}
    and Db_j + min[ ql(zb·Tb_j + (zb-1)Db_j) + zb·Rb_j, Da_i ]
    + Db_{j+1} ≤ Ta_i
        then continue at [C.1]
    [B.3]
    if Da_i ≤ Tb_{j+2} + Rb_{j+2} + Tb_{j+3}
    and Db_j + min[ ql(zb·Tb_j + (zb-1)Db_j) + zb·Rb_j, Da_i ]
    + Db_{j+1} + min[ zb·(Tb_{j+1} + Rb_{j+1}) + (zb-1)Db_{j+1}, Da_i ]
    + Db_{j+2} ≤ Ta_i
        then continue at [C.1]
    exit the loop with failure code
    [C.1]
    if Db_j ≤ Ta_i
        then continue at [D]
    [C.2]
    if Db_j ≤ Ta_i + min[ Tb_j–Da_i, Ra_i, Ra_{i-1} ]
        then continue at [D]
    exit the loop with failure code
    [D] next j
next i
```

In case 3) of the scheduling process described above, the margin of time to consider is the minimum value, i.e. T and not zT.

The principles presented above have been described with two tasks to execute in timesharing, but they apply to any number of tasks. Indeed, the described method makes it possible in practice to compose a single sequencing plan for two compatible tasks. The sequencing plan thus obtained may be composed again, using the same techniques, with a sequencing plan for a third compatible task, and so on.

The invention claimed is:

1. A method for executing two tasks in timesharing, comprising the steps of:
    decomposing offline each task in a respective repetitive sequence of consecutive dissimilar frames (RSF) in a time base associated with the respective task, wherein each frame is associated with an atomic operation having an execution need, and defines: (i) a start date after which the operation starts, (ii) a deadline before which the atomic operation ends, and (iii) a time margin equal to a duration of the frame minus the execution need of the atomic operation;
    performing a verification step for each, current frame of the RSF of a first of the two tasks, including:
        determining a group of consecutive frames of the RSF of a second of the two tasks where each frame of the group overlaps the current frame, and
        checking that the atomic operation of the current frame can complete between any two successive atomic operations of the group of consecutive frames while meeting the start dates and deadlines of the atomic operation of the current frame and of the atomic operations of the group of consecutive frames; and
    if the verification step determines that the atomic operation of the current frame can complete, allowing the execution of the two and scheduling the atomic operations of the two tasks according to the following cases, evaluated at each date in a group of key dates comprising the deadlines, the start dates, and the ends of the atomic operations:
        if an atomic operation of each task can start, executing the atomic operation having a shorter deadline; and
        if an atomic operation of only one of the two tasks can start, executing the atomic operation only if the execution need of the atomic operation is less than the time remaining until the start date of the next frame of the RSF of the other of the two tasks, plus the time margin associated with said next frame.

2. The method of claim 1, wherein
    each frame further includes a reserve time interval, located after the deadline of the frame or before the start of the frame, and
    the reserve time intervals of the RSF of an of the two tasks are added to the time margins for executing atomic operations in the RSF of the other task.

3. The method of claim 2, wherein the verification step includes the following steps:
    for each frame $Fa_i$ of the RSF of the first task, evaluating the following conditions for each frame $Fb_j$ of the RSF of the second task:

$$Da_i \leq Tb_{j+1} \qquad [A.1]$$

$$Da_i \leq Rb_j + Tb_{j+1}$$

and $$Db_j \leq Ta_i, \qquad [B.1]$$

and $$Db_j \leq Ta_i, \qquad [C.1]$$

where D, T and R are the execution need, the time margin, and reserve time, indexed by a RSF identifier and the frame number in the sequence;
    repeating the previous step with the frame $Fa_i$, $Fb_j$ exchanged;
    authorizing execution of the tasks if the three conditions [A.1], [B.1] and [C.1] are satisfied for any pair (i, j).

4. The method of claim 3, wherein the verification step includes the following steps:
    if the condition [A.1] is false, evaluating the following condition:

$$Da_i \leq Tb_{j+1} + Rb_{j+1} + Tb_{j+2}$$

$$\text{and } Da_i + Db_{j+1} \leq Ta_i + Tb_{j+1} \qquad [A.2]$$

if the condition [B.1] is false, evaluating the following condition:

$$Da_i \leq Tb_{j+1} + Rb_{j+1} + Tb_{j+2}$$

$$\text{and } Db_j + Da_i + Db_{j+1} \leq Ta_i + Tb_{j+1} \qquad [B.2]$$

if the condition [C.1] is false, evaluating the following condition:

$$Db_j \leq Ta_i + \min[Tb_j - Da_i, Ra_i, Ra_{i-1}] \qquad [C.2]$$

authorizing execution of the tasks if the conditions [A.1] or [A.2] and [B.1] or [B.2] and [C.1] or [C.2] are met for each pair (i, j).

5. The method of claim 3, wherein the time bases determining the durations of the frames are variable so that time margins T and the reserve times R vary by a factor 1 to za for the frames Fa and a factor 1 to zb for the frames Fb, the verification step further comprising the steps of:

if the condition [A.1] is false, evaluating the following condition:

$$Da_i \leq Tb_{j+1}+Rb_{j+1}+Tb_{j+2}$$

and $\min[ql(zb \cdot (Tb_j+Rb_j)+(zb-1)Db_j), Da_i]+Db_{j+1} \leq Ta_i$ [A.2]

where $ql=(Da_i-Tb_{j+1})/(Tb_j+Rb_j)$;

if the condition [B.1] is false, evaluating the following condition:

$$Da_i \leq Tb_{j+1}+Rb_{j+1}+Tb_{j+2}$$

and $Db_j+\min[ql(zb \cdot Tb_j+(zb-1)Db_j)+zb \cdot Rb_j, Da_i]+Db_{j+1} \leq Ta_i$ [B.2]

where $ql=(Da_i-Rb_j-Tb_{j+1})/Tb_j$;

if the condition [C.1] is false, evaluating the following condition:

$$Db_j \leq Ta_i+\min[Tb_j-Da_i, Ra_i, Ra_{i-1}]$$ [C.2]

authorizing execution of the tasks if the conditions [A.1] or [A.2] and [B.1] or [B.2] and [C.1] or [C.2] are met for each pair (i, j).

6. The method of claim 5, wherein the verification step includes the following steps:
if the condition [B.1] is false, evaluating the following condition before the condition [B.2]:

$$Da_i \leq Tb_j+Rb_j+Tb_{j+1}$$

and $Db_{j-1} \leq Tl+\min[Tb_{j-1}+Db_{j-1}+Rb_{j-1}-Tl-Da_{i-1}, Ra_{i-2}]$ [B.1.1]

where $ql=(Da_i-Rb_j-Tb_{j+1})/Tb_j$ and $Tl=(1-ql)Tb_j+Ra_{i-1}$ authorizing execution of the tasks if the conditions [A.1] or [A.2] and [B.1] or [B.1.1] and [C.1] or [C.2] are met for each pair (i, j).

7. The method of claim 1, wherein the time bases of the two tasks are uncorrelated.

8. A method for executing two tasks in timesharing, comprising the steps of:
decomposing offline each task in a respective repetitive sequence of consecutive frames (RSF) in a time base associated with the respective task, wherein each frame is associated with an atomic operation having an execution need, and defines i) as start date on or after which the atomic operation starts, ii) a deadline on or before which the atomic operation ends, iii) a time margin equal to a duration of the frame minus the execution need of the atomic operation, and iv) a reserve time interval is zero or greater, located after the deadline or before the start date;
for each frame $Fa_i$ of the RSF of a first of the two tasks, evaluating the following conditins for each frame $Fb_j$ of the RSF of the second of the two tasks:

$$Da_i \leq Tb_{j+1}$$ [A.1]

$$Da_i \leq Rb_j+Tb_{j+1}$$

and $$Db_j \leq Ta_i,$$ [B.1]

and $$Db_j \leq Ta_i, tm$$ [C.1]

where D, T and R are the execution need, the time margin, and reserve time, indexed by an RSF indentifier and the frame number in the sequence;

repeating the previous step with frame $Fa_i$ and $Fb_j$ exchange;
authorizing executing of the tasks if the three conditions [A.1], [B.1] and [C.1] are satisfied for any pair (i, j); and
scheduling the atomic operations of the two tasks authorized for execution according to the following cases, evaluated at each date in a group of key dates comprising the deadlines, the start dates, and the ends of the atomic operations:
if an atomic operation of each task can start, executing the atomic operation having a shorter deadline; and
if an atomic operation of only one of the two tasks can start, executing the atomic operation only if the execution need of the atomic operation is less the time remaining until the start date of the next frame of the RSF of the other of the two task, plus the time margin associated said next frame.

9. The method of claim 8, wherein the verification step comprises the following steps:
if the condition [A.1] is false, evaluating the following condition:

$$Da_i \leq Tb_{j+1}+Rb_{j+1}+Tb_{j+2}$$

and $Da_i+Db_{j+1} \leq Ta_i+Tb_{j+1}$ [A.2]

if the condition [B.1] is false, evaluating the following condition:

$$Da_i \leq Tb_{j+1}+Rb_{j+1}+Tb_{j+2}$$

and $Db_j+Da_i+Db_{j+1} \leq Ta_i+Tb_{j+1}$ [B.2]

if the condition [C.2] is false, evaluating the following condition:

$$Db_j \leq Ta_i+\min[Tb_j-Da_i, Ra_i, Ra_{i-1}]$$ [C.2]

authorizing execution of the tasks if the conditions [A.1] or [A.2] and [B.1] or [B.2] and [C.1] or [C.2] are met for each pair (i, j).

10. The method of claim 8, wherein the time bases determining the durations of the frames are variable so that the time margins T and the reserve times R vary by a factor 1 to za for the frames Fa and a factor 1 to zb for the frames Fb, the verification step further comprising the steps of:
if the condition [A.1] is false, evaluation the following condition:

$$Da_i \leq Tb_{j+1}+Rb_{j+1}+Tb_{j+2}$$

and $\min[ql(zb \cdot (Tb_j+Rb_j)+(zb-1)Db_j), Da_i]+Db_{j+1} \leq Ta_i$ [A.2]

where $ql=(Da_i-Tb_{j+1})/(Tb_j+Rb_j)$;

if the condition [B.1] is false, evaluating the following condition:

$$Da_i \leq Tb_{j+1}+Rb_{j+1}+Tb_{j+2}$$

and $Db_j+\min[ql(zb \cdot Tb_j+(zb-1)Db_j)+zb+Rb_j, Da_i]+Db_{j+1} \leq Ta_i$ [B.2]

where $ql=(Da_i-Rb_j-Tb_{j+1})/Tb_j$;

if the condition [C.1] is false, evaluating the following condition:

$$Db_j \leq Ta_i+\min[Tb_j-Da_i, Ra_i, Ra_{i-1}]$$ [C.2]

authorizing execution of the tasks if the conditions [A.1] or [A.2] and [B.1] or [B.2] and [C.1] or [C.2] are met for each pair (i, j).

11. The method of claim 10, where in verification step comprises the following steps:

if the condition [B.1] is false, evaluation the following condition before the condition [B.2]:

$$Da_i \leq Tb_j + Rb_j + Tb_{j+1} \tag{5}$$

$$\text{and } Db_{j-1} \leq Tl + \min[Tb_{j-1} + Db_{j-1} + Rb_{j-1} - Tl - Da_{i-1}, Ra_{i-2}] \tag{B.1.1}$$

where $ql = (Da_i - Rb_j - Tb_{j-1})/Tb_j$ and $Tl = Ta_{i-1} - (1-ql)Tb_j + Ra_{i-1}$ (10)

authorizing execution of the tasks if the conditions [A.1] or [A.2] and [B.1] or [B.1.1] and [C.1] or [C.2] are met for each pair (i, j).

* * * * *